United States Patent [19]

Arnaud

[11] Patent Number: 4,639,100

[45] Date of Patent: Jan. 27, 1987

[54] ASTIGMATIC OPTICAL ELEMENT, ITS MANUFACTURING PROCESS, ILLUMINATING APPARATUS INCLUDING THE SAME AND ARTICLES TREATED BY THE SAME

[76] Inventor: Jean P. Arnaud, 23, rue de Pontoise, Moutmorency, F-95160, France

[21] Appl. No.: 584,945

[22] PCT Filed: Jun. 7, 1983

[86] PCT No.: PCT/EP83/00146
§ 371 Date: Feb. 10, 1984
§ 102(e) Date: Feb. 10, 1984

[87] PCT Pub. No.: WO83/04439
PCT Pub. Date: Dec. 22, 1983

[30] Foreign Application Priority Data

Jun. 11, 1982 [FR] France .................................. 82 10286

[51] Int. Cl.⁴ .................................................. G02B 5/08
[52] U.S. Cl. ........................................................ 350/611
[58] Field of Search ............................... 350/607–611

[56] References Cited

U.S. PATENT DOCUMENTS

| | | | |
|---|---|---|---|
| 2,129,513 | 3/1937 | Wegner | 350/607 |
| 4,043,644 | 8/1977 | Humphery | 350/607 |
| 4,119,366 | 10/1978 | Lemaitre | 350/608 |
| 4,139,270 | 2/1979 | Dotson . | |
| 4,197,157 | 4/1980 | Haggery . | |
| 4,382,657 | 5/1983 | Lemaitre | 350/608 |

Primary Examiner—John K. Corbin
Assistant Examiner—David Lewi
Attorney, Agent, or Firm—A. W. Breiner

[57] ABSTRACT

On optical element, such as a mirror, for example, has an optically polished surface which is neither planar or a section of surface of revolution. According to the invention, a flat member is machined along a second face so that the thickness of the flat member varies. The first face is optically polished when it is planar. The flat member is then distorted so that the surface is neither planar nor a section of surface of revolution. Such mirrors are used for distributing laser beam energy along lines or over extended areas with constant energy density.

4 Claims, 3 Drawing Figures

ASTIGMATIC OPTICAL ELEMENT, ITS MANUFACTURING PROCESS, ILLUMINATING APPARATUS INCLUDING THE SAME AND ARTICLES TREATED BY THE SAME

The invention relates to optical systems especially used in illuminating apparatus. So, it relates to an astigmatic optical element, to its manufacturing process, to an illuminating apparatus including such an optical element, and to ariticles treated by such an apparatus.

In the following, "optical element" means a reflecting or refracting optical element, such as a mirror or a lens, having an optically polished surface which is not a revolution surface. The word "astigmatic" means that such an optical element is not anastigmatic, that it does not form an image point of an object point. By example, such an optical element distributes energy from a point source along a line or over an extended area.

BACKGROUND OF THE INVENTION AND PRIOR ART

The particular problem originally solved by the invention is forming a focusing line along which energy density is uniform, from a monomode or mixed mode laser beam. Obviously, the invention is not restricted to this field, but this problem is interesting to understand the features of the invention.

In many technical fields, focusing laser beam energy along a line or distributing such energy over an extended area, with a uniform energy density, is desired, but known systems either integrate energy during time, preventing real time treatment and generating different treatment conditions, or chop the greatest part of available power, the energy yield being only about 30%.

The present invention relates to an optical system which gives such an energy distribution. The problem presented by such an optical system is that at least a reflecting or refracting surface must have a shape far different from a revolution shape, which shape cannot be obtained by classical processes used in the optical art because surface polishing can be provided only for plane or revolution surfaces.

Some optical systems having a surface which is not strictly a plane or spherical have been provided. For example, French Pat. No. 2 472 198 discloses a process in which a glass blank is cast and one of its faces is polished either as a plane surface or as a spherical surface. Distorting forces are thereafter applied to the blank, for example by vacuum, and the blank which is suitably maintained along its edges is globally distorted. The obtained deformation is very small and corresponds at maximum to some wavelengths of visible light. This deformation is for correcting aberrations of images formed by optical systems.

NASA has also developed a flexible mirror for correcting aberrations in images of planets and satellites observed by space probes. This mirror includes many piezoelectric actuators providing for local distortions of the reflecting surface, the distortions having an amplitude of about a wavelength of visible light.

So, these optical systems use processes providing for very slight changes of the reflecting surface configuration and which do not give its main curvature to the surface.

Distorting mirrors used for example in fairs and attractions are also known. They are constructed from metallic plates distorted in alternate directions to provide enlarged or reduced images. Mirror thickness is constant and obtained shapes are not precisely determined, the distortions being very great. Optical quality of these mirrors is low.

SUMMARY OF THE INVENTION

The invention relates to providing astigmatic optical elements having at least a surface which is neither plane nor of revolution and which has an excellent optical polish. The surface can be very different from a plane or revolution surface.

According to the invention, when an optician has determined the ruled surface configuration he desires, he computes the thickness variation of a flat member so that when selected stresses or forces are applied to such member one of its surfaces takes the desired configuration. The surface can be polished when the flat member is not yet distorted, and the flat member is then distorted for its polished surface to take the desired configuration. Alternately, the surface is polished when distorting forces are applied to the member, and the polished surface takes the desired configuration either by suppressing forces or by applying different forces.

According to the invention, an astigmatic optical element for modifying energy distribution in a radiation beam, includes a flat member having variable thickness, pliable between at least two states and having two opposite large faces, these two states being a preparing state in which a first large face is plane or of revolution and a second large face is substantially a ruled surface, and a working state in which the first large face is neither plane nor of revolution and a second large face substantially a ruled surface, deformation between said two states being provided for by a distributed flexion of a flat member around generatrices of the ruled surface, the first large face of the flat member having an optical polish; the flat member is put in its preparing state for polishing a first large face, and in working state when an optical element is used for reflecting or refracting a radiation beam.

The whole deformation of the flat member from one state to another can be included in an elastic deformation range of a member material. For example, when a flat member is constructed from metal like copper or molybden, deformation can be small enough for applied stresses which do not pass beyond the material yield strength. In these conditions, a flat member can be repetitively distorted from one state to the other and inversely. Alternately, if the applied stresses are above the material yield strength, the flat member is subjected to a permanent deformation. For example, some annealed copper mirrors have such a deformation.

Force application is required for a flat member deformation and so, an optical element preferably includes force application means. Such means can apply forces in one of preparing and working states or in these two states, as required. Preferably, the force application means applies forces to said flat member when said member is to be set at its working state. Such feature is especially preferable when the flat member has several working states, amplitude or direction of applied forces determining the peculiar working state taken by said member.

Preferably, ruled surfaces of the flat member are cylindrical surfaces.

Preferably, a first large face is reflecting. The reflecting surface can be directly constituted by the material of the flat member, when such material is metallic, or by a surface of the flat member constituted by a non-reflecting material, coated by reflecting metallic layers.

The invention also relates to a process for forming a surface with an optical polish, including forming a variable thickness flat member, having two large faces, polishing a first large face of said member and applying distorting forces to the flat member, either during polishing, or during polished surface utilization, or, with different forces providing for different deformations, during polishing and during polished surface utilization. According to the invention, forming said variable thickness member includes forming a member having a second large face which is a non-plane ruled surface. Polishing said first face is effected when such face is plane or of revolution, and deformation force application is provided for by distributed flexion of the flat member around the flat member generatrices.

Forming said variable thickness flat member can be provided by machining said second face. Such machining can be by example milling, grinding, electric discharge machining or all suitable known technics. However, said variable thickness flat member can also be prepared by casting.

Preferably, deformation forces are applied by embedding two edges of the flat member parallel to generatrices into two maintaining members, and by applying contracting or spreading forces to said maintaining members, at some distance from the flat member, in a direction substantially parallel to said member and normal to its generatrices. Deformation forces can be applied with a fulcrum acting parallel to at least a generatrix. Force application can provide for deformation of any type, by example by plate buckling or, an the contrary, by straightening of a plate having some curvature.

In another aspect, the invention relates to an illuminating apparatus including an energy beam source or generator, preferably a laser source, a reflecting optical element as above-mentioned according to the invention, and a further mirror, the variable flat member thickness, applied deformation forces and further mirror configuration being such that, in a selected plane transverse to said energy beam downstream of said optical element and said further mirror, the energy distribution is predetermined.

In one embodiment, said further mirror is a cylindrical mirror with a circular right section for forming a focusing line, and said optical element having a variable thickness so that, along the focusing line, energy quantity variation is predetermined, by example, zero.

In another embodiment, said further mirror is also a reflecting optical element according to the invention, and the two optical elements are positionned such that a plane including energy beam axis and a first optical element generatrix is substantially perpendicular to a plane including said beam axis and a second optical element generatrix, said two optical elements having thicknesses varying so that the energy density by unit area in said selected plane is predetermined. This variation can be zero and, in this case, energy density is constant in an extended area.

In another embodiment, an apparatus includes a further optical system, positioned along said beam ahead of the optical element and for modifying a geometrical parameter of said beam. Such a further optical system can be a simple concave or convex mirror having a cylindrical shape of the circular right section, or it can be afocal optical system, by example constituted by two cylindrical mirrors. It is especially preferably for this further optical system to be constituted by two pliable cylindrical mirrors each having a constant thickness. The two flat members are differently distorted so that the two curvature centers are substantially confused. Such a system is especially preferable because it allows using a same optical element according to the invention to obtained a continuous focusing line having a selected length from monomode laser beams of different diameters.

In another embodiment, the illuminating apparatus also includes means for conveying articles with a selected velocity, said means being positioned so that the article surface is conveyed in a portion of said selected plane in which energy distribution is predetermined, by example constant. Such an apparatus is especially suitable for treating solid material articles, by example for thermal treating of articles.

In another aspect of the invention, a process is provided for illuminating articles by using such an apparatus. The illuminating process is especially useful when said apparatus forms a focused line having a substantially constant energy density or an extended area in which energy density is substantially constant. The selected velocity of said conveying means is also adjusted according to the desired treatment. When velocity is relatively great, said treatment is a mere modification of structure of a superficial portion of the conveyed article, the surface material being kept under the melting temperature. When conveying velocity is lower, the superficial article portion can be in a melted or viscous state fluid enough to provide for some superficial rearrangement. When the velocity is still lower and/or energy density greater, the material of the superficial portion can be volatilized either completely or by volatilization of some elements only.

In an other aspect of the invention, solid material articles have at least a portion of superficial area which has a structure different from that of untreated article material, such different structure being provided by illuminating said superficial portion in an illuminating apparatus as above disclosed.

BRIEF DESCRIPTION OF DRAWING

Other features and advantages of the invention will be better understood from the following description of particular embodiments, referring to the drawing in which.

DETAILED DESCRIPTION

Figure 1:
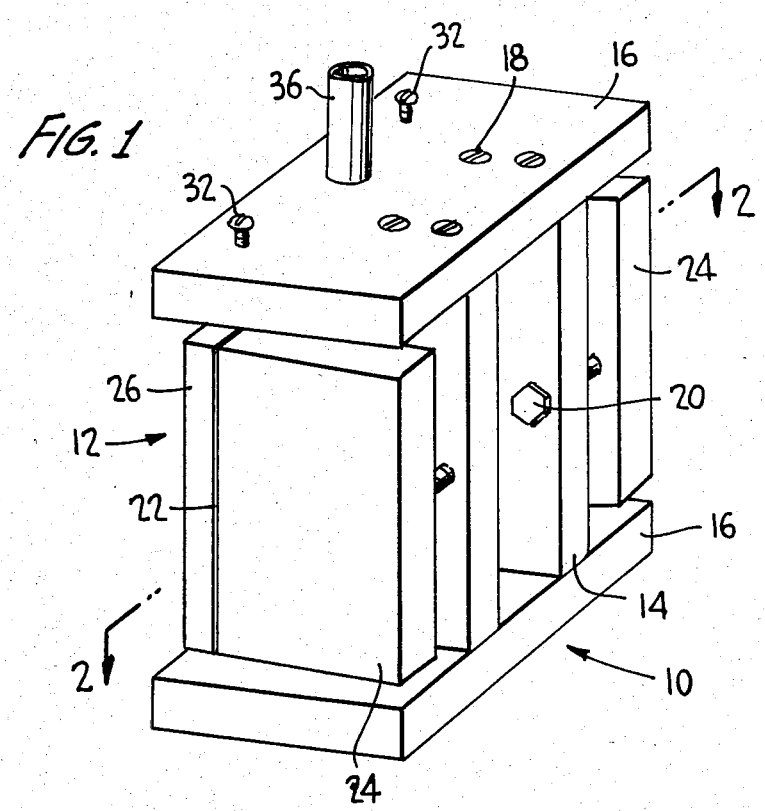
FIG. 1 is a perspective of an equalizer cylindrical mirror according to the invention.

FIG. 1 is a perspective of a typical astigmatic optical element according to the invention, forming a mirror for energy equalizing along a focusing line formed by a cylindrical mirror having a circular right section (not shown).

The equalizing concave mirror shown by FIG. 1 includes a fixed unit 10 and a pliable unit 12. Fixed unit 10 includes a U-shape bar member 14 having a rectangular plate 16 fixed by screws 18 at each end. Member 14 and plates 16 form a rigid unit which can be mounted by example on a supporting post. Two threaded holes 19 are formed through sides of member 14 and are coaxially positioned. Screws 20 are received in threaded holes 19.

Pliable unit 12 first includes a flat member 22 with variable thickness, forming a pliable plate, and two supports 24. In the shown embodiment, plate 22 has holes in its edges for receiving screws for clamping straps 26 against supports 24 so that edges of plate 22 are practically "embedded" in maintaining members each including a support 24 and a strap 26.

Figure 2:
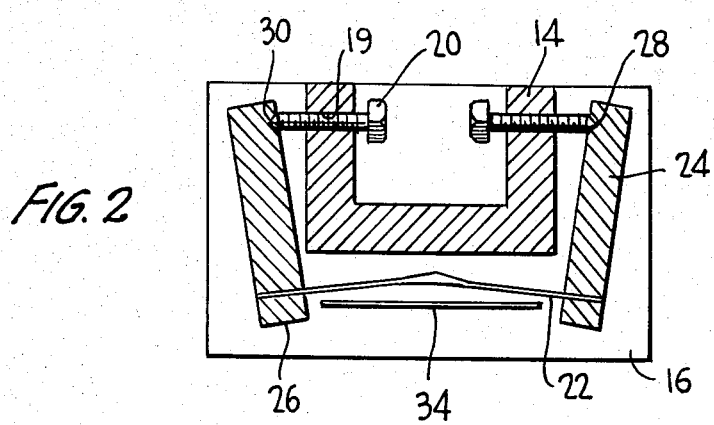
FIG. 2 is a top elevation cross-sectionnal view along line 2—2 of FIG. 1.

The pliable unit is supported by fixed unit 10 through the two screws 20. Conical sockets 28 with conical angles of 90° are formed in supports 24 of maintaining members and receive rounded ends 30 of screws 20. So, as shown by FIG. 2, threading screws 20 into holes 19 spreads external portions (in FIG. 2) of supports 24 which spread at some distance from plate 22. Plate 22 has to flex as a hinge and then takes a configuration which depends on its thickness. As thickness varies, configuration of plate 22 varies. Computing easily allows determination of obtained configuration, as shown by the following example.

It is to be noted that the pliable unit is maintained only by two screws 20 which allow pivoting around their rotation axis. Pliable unit so tends to come against one of plates 16, and it is retained by screws 32 (two only are shown in FIG. 1) disposed above and under straps 26 and allowing adjustment of the pliable unit positioned around its rotation axis passing through screws 20. Alternately, the two screws 32 of each plate 16 are replaced by a central screw pushing against the central portion of a bar (not shown) positioned against straps 26.

It is also to be noted in FIG. 2 that slots 34 form openings in plates 16 near the edges of plate 22. The slots are for blowing air or other gas along plate 22 when it is illuminated by a laser beam. Each slot 34 communicates with a chamber (not shown) formed inside each plate 16 and connected by a port 36 to suitable compressed air or gas source. Blowing of gas provides for cooling plate 22 and for preventing dirt deposition on plate. Such a mounting allows illuminating plate 22 with energy density of about 2500 to 3500 W/cm$^2$ and more.

Figure 3:
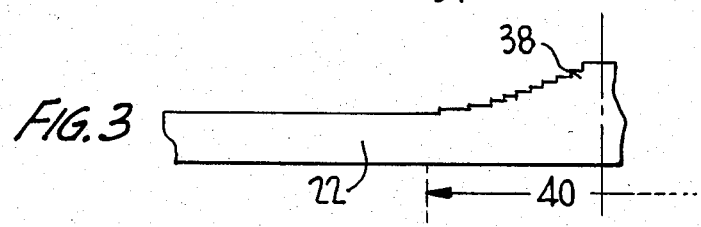
FIG. 3 is a schematic partial sectionnal view of an example of a flat member obtained by milling according to the invention.

FIG. 3 is a schematic cross-section of a typical plate 22 according to the invention. It is to be noted that projection 38 is limited by steps opposite the area 40 of the large face truly illuminated when the mirror is used. As the steps have a very small height (some hundredths of millimeter) and have mid-points of steps on the desired theoretical curve for thickness variation, useful reflecting portion 40, when distorted, takes a configuration practically identical to the desired theoretical curve.

When the flat member shown as plate 22 is manufactured, a plate having a thickness above maximal thickness (by some tenths of a millimeter) is rectified so that a first large face is plane. Rectified face is then fixed to a rigid support and the second face is machined for example by milling along steps. The plate is then removed from the rigid support, and second face is embedded in a plaster or plastic material block, and the first face is then polished. The flat member can be used after removal of plaster or plastic material, respectively.

The plate can be formed of OFHC copper. Annealed copper, molybden, gold coated metals are others useful materials.

Computing the thickness variation desired for a plate is not described because it is well-known by the man in the art of material elasticity and is easy. Thickness variation depends on how the distorting forces are applied to the plate. Embedment of the plate has been shown in the typical embodiment, but the plate can be simply clamped between two jaws, or it can be polished when it has the configuration of a circular right section cylinder, and straightened by pulling the edges. Variable thickness parts having obviously been formed before by machining the second face opposite to the polished face. So, the plate designing depends on expected force application mode. Applied forces themselves obviously depend on the material used for the plate. Computing is obviously simpler when the material is homogeneous and isotropic. However, materials having anisotropic properties can be used, a preferential direction then being parallel or perpendicular to generatrices.

In a typical embodiment, a cylindrical mirror is designed for distributing energy from a monomode laser generator beam having a gaussian energy distribution with a diameter equal to 10,5 mm (at $1/e^2$). Constant energy can be obtained along a focusing line having a length of 7 mm and formed by a further cylindrical mirror having a circular right section. This mirror has a focal length equal to 150 mm. The curvature radius required for the polished equalizing mirror surface is computed from the center for obtaining a focusing line with a constant energy density when the equalizing mirror is 300 mm ahead of the focusing mirror. Computing shows that the curvature radius of the equalizing mirror varies from 1744 mm at center to 451 mm at 13 mm away from center. At 5 mm from center, the radius is 650 mm and, at 10 mm from center, it is 460 mm. The thickness of an annealed copper plate 22 having a free length of 60 mm between two embedding members 24,26 is then computed. The central thickness is selected with a value of 2,90 mm. Thickness is then computed and it is 1.97 mm at 5 mm from center, 1,63 mm at 10 mm from center, and 1,53 mm at 13 mm from center. (Results are rounded at the nearest millimeter hundredth). The plate is then milled with steps of 0,5 mm width (measured across the plate). Step heights are computed so that each step center is on the desired theoretical curve.

When this equalizing mirror and a further cylindrical mirror are used, they form a focusing line of 7 mm length and 0,3 mm width, in which about 95% of incident laser beam energy is included.

According to the invention, a uniform energy distribution can also be obtained over a plane. So, two equalizing mirrors can be used, by example with the same thickness variation. In an embodiment, two equalizing mirrors designed with above-indicated dimensions are positionned so that plane including beam axis and a respective generatrix are mutually perpendicular. Different forces are applied to the two mirrors so that the plane in which energy distribution is uniform is the same for the two mirrors, though mirrors are positionned sequentially along the beam axis. Energy density is practically constant in a square of 7 mm×7 mm.

When the ruled surface of the second flat member is cylindrical, that is when generatrices are all parallel, mirrors shifted by 90° around the beam axis do not introduce aberrations. In fact, in each plane including a generatrix and parallel to laser beam, the flat member acts as a simple plane mirror and so does not generate aberrations.

The above-described optical system forming a focusing line of 7 mm length is used for treating articles formed from different materials.

In a first example, the article is constituted from 40 CDV 20 steel. The article is conveyed so that the focusing line is practically at the article surface. Conveying velocity is selected so that the applied energy quantity is about 1000 J/cm². After treatment, it appears that the article has been surface hardened, its Vickers hardness HV50 being increased from 220 in base metal to 400 at a distance of 0,1 mm from the surface and to 500 at the surface.

In an other example, this article is replaced by a sintered alumina article containing 96% of $Al_2O_3$. Applied energy density is about 50 J/cm², conveying velocity being proportionately increased. Root mean square roughness is reduced from about 0,1 micron before treating to less than 0,005 micron after treating.

INDUSTRIAL WORKING POSSIBILITIES

Astigmatic optical elements according to the invention have many industrial applications in very different technical fields. For example, mechanical and metallurgical applications are known in which X-Y scanning of laser beams is used for surface treatment. The illuminating apparatus according to the invention is especially suitable in these applications. For example, known processes are surface treatment such as surface metal hardening, for example local hardening of crankshafts, etc, valve seat plating, for example with corrosion resistant alloy, etc. Treatments such as laser glazing are practically useful only with such an optical system.

In other technical fields, the illuminating apparatus allows roughness reduction. For example, sintered alumina ceramics can be practically glazed. This treatment is preferably used for electronic circuit substrates and for sealing pieces, which are now ground by a costly process.

What is claimed is:

1. Process for forming an optical element, said process comprising the steps of
    forming a varied thickness flat member having first and second large faces, said first large face having a polished surface which is selectively planar or a section of a surface of revolution, and said second large face including at least a central portion which is a non-planar ruled surface having plural separate surfaces each defined from a generatrix, and
    distorting said flat member by flexing said flat member around generatrices of said separate surfaces of said ruled surface to shape said polished surface as an optical surface which is neither planar nor a section of a surface of revolution.

2. Process according to claim 1, further characterized in that forming said variable thickness flat member includes machining said second large face of said flat member.

3. Process according to claim 2, further characterized in that the machining is provided for by a working step selected in the group including milling, grinding and electric discharge machining.

4. Process according to claim 1, further characterized in that applying said distorting forces includes embedding two edges of said flat member parallel to the generatrices in two maintaining members, and applying contracting or spreading forces to said two maintaining members at some distance from said flat member in a direction substantially parallel to said flat member and substantially perpendicular to the generatrices.

* * * * *